United States Patent
Fiore et al.

(10) Patent No.: US 8,358,345 B1
(45) Date of Patent: Jan. 22, 2013

(54) SYSTEM AND METHOD OF VIDEO CAPTURE FOR SPORTS APPLICATIONS

(75) Inventors: John T. Fiore, Derwood, MD (US); K. Stephen Book, Fairfax, VA (US)

(73) Assignee: Monitoring Technology Corporation, Fairfax, VA (US)

( * ) Notice: Subject to any disclaimer, the term of this patent is extended or adjusted under 35 U.S.C. 154(b) by 1254 days.

(21) Appl. No.: 12/051,802

(22) Filed: Mar. 19, 2008

Related U.S. Application Data (60) Provisional application No. 60/907,082, filed on Mar. 19, 2007.

(51) Int. Cl.
H04N 7/18 (2006.01)
H04N 5/76 (2006.01)
H04N 5/05 (2006.01)

(52) U.S. Cl. ............ 348/157; 348/231.5; 348/523

(58) Field of Classification Search ........ 348/157, 348/231.5, 523
See application file for complete search history.

(56) References Cited

U.S. PATENT DOCUMENTS

| | | | |
|---|---|---|---|
| 5,769,713 A * | 6/1998 | Katayama | 463/3 |
| 5,905,536 A * | 5/1999 | Morton et al. | 348/441 |
| 5,923,365 A * | 7/1999 | Tamir et al. | 348/169 |
| 6,757,005 B1 * | 6/2004 | Elbaz et al. | 348/14.09 |
| 2002/0041284 A1 * | 4/2002 | Konishi et al. | 345/473 |
| 2005/0031092 A1 * | 2/2005 | Umemura et al. | 379/88.13 |
| 2005/0058430 A1 * | 3/2005 | Nakamura et al. | 386/52 |
| 2006/0048057 A1 * | 3/2006 | Herberger et al. | 715/723 |
| 2007/0274672 A1 * | 11/2007 | Itoi | 386/46 |

* cited by examiner

*Primary Examiner* — Patrice Winder
*Assistant Examiner* — Ebrahim Golabbakhsh
(74) *Attorney, Agent, or Firm* — J.A. Lindeman & Co., PLLC (57) ABSTRACT

A system for monitoring a sporting event includes devices for monitoring characteristics of the event and collecting monitored data. Devices address different aspects of the event and monitor and collect real-time data. The devices process the data into digitized frames, and a digital storage device receives and stores the frames in a random access storage buffer as time-stamped digitized data frames with unique addresses. The storage device is capable of both time-shifting and relational association. The system includes a controller and devices for monitoring and extracting a digitized data frame according to a predetermined criterion. A viewer communicates with the storage device and controller and selects, manipulates, and extracts the digitized data frame. The system records and plays back the monitored data using a circular storage buffer with a memory mapped file and allows playback of stored data without interrupting simultaneous recording of new input data.

37 Claims, 7 Drawing Sheets

SYSTEM AND METHOD OF VIDEO CAPTURE FOR SPORTS APPLICATIONS

CROSS-REFERENCE TO RELATED APPLICATIONS

The present application claims the benefit of U.S. Provisional Patent Application Ser. No. 60/907,082 entitled "A Video Capture System for Sports Applications" filed Mar. 19, 2007. This provisional application is incorporated by reference in its entirety.

FIELD OF THE INVENTION

The present invention is generally directed to video capture and data recording and more particularly to systems and methods of capturing video for sports applications and allowing replay and analysis of a time sampled signal.

BACKGROUND OF THE INVENTION

In various sports applications, it may be beneficial for coaches and players to view images from previous games or previous plays of a game in progress to better execute the plays or to better defend against an opponent's plays. Currently, video cameras and printers may be used to view images from previous plays. For example, National Football League™ teams may bring video cameras and video printers to each game. Cameras may be placed above the end zone and sidelines. Printers may be placed on the respective team's sidelines and in the coaches' booth. Each video camera signal output may be connected to one or more sideline printers and to coaches' printers. During each play, a system operator may hit a button to print a thermal image of the play for each camera. Both the sideline and the booth may receive the same printout, label the play, and place it in a binder to save the printout for review. The printers often take about one minute to print, thereby only allowing one print per play. The printouts may be used to show play formation and play action to facilitate game-time coaching and strategic options. Coaches may show the photos to players during games to suggest changes or after the game to assist in analysis of a team's performance.

The printers may print color pictures or monochrome printouts. The printers often take from 10-90 seconds to print, and for color prints, the printers may require 60 seconds or more to print. The pixel resolution of the printouts may be 403×403 with limited image quality, and the cameras may provide limited features, such as those afforded by an optical glass zoom. Telestration allows a person reviewing video or still images on an electronic viewing medium to draw or write freehand notes and sketches associated with the displayed image(s). To provide Telestration, a coach may mark up the print manually with a marker. If coaches wish to collaborate, they are often limited to communicating via additional audio means to supplement the paper printout. The prints are manually labeled to show each play, and the prints are cataloged manually, such as by filing the prints in separate binders.

The systems and methods currently available have significant limitations with regard to the speed at which a picture may be viewed, the speed at which an image may be printed, the image quality of the print, and the ability to enhance the print using Telestration, labeling, cataloging, and other collaboration options. Efforts to date to improve the ability of such video recording and playback systems for sports applications do not provide immediate retrieval and viewing of the captured sports event data. Previously available systems have been largely unsuccessful in providing a cost-effective manner of storing and playing back sports event data that allows easy and rapid viewing and printing of the recorded data. Efforts aimed at improving the ability of coaches to monitor sporting events and discrete aspects of the events have been extremely labor-intense and have not provided a satisfactory return on the amount of resources expended. What is needed is a system and a method for recording and playing back desired aspects of a sporting event that avoids the shortcomings of previous systems.

SUMMARY OF THE INVENTION

The system and method of the present invention extends the capabilities of video capture for sports applications. The present invention provides improved temporal resolution capabilities and video resolution capabilities to observe real-time sports events and to capture events that often occur instantaneously and intermittently. The system and method of the present invention captures and stores real-time data in a circular storage buffer and avoids problems associated with dropped frames and unrecorded data.

"Dropped frames" are frames of real-time data that have not been captured and stored into the circular storage buffer. Because these dropped frames are not recorded, these frames are lost forever, and processes or events that occurred during the dropped frames cannot be retrieved at a later time, resulting in the loss of potentially critical data.

The systems and methods of the present invention avoid bottlenecks in transferring data and in transferring other computer instructions as an operator retrieves and/or compiles data and other files. The computing resources of the data recording and playback system of the present invention do not become occupied and bogged down, and there is no delay in executing instructions to record and store the sports event data. The system and method of the present invention enable the operator of the data recording and playback system to view the stored data at the same time that data is being recorded. The system and method of the present invention provide analysis and replay of time-stamped data with a number of features, including variable spatial resolution and variable temporal resolution.

Variable spatial resolution features of the present invention may be used to provide zoomed images, image cropping, panoramic stitching, portrait and landscape views, image rotation, image filters, and other image manipulation. Variable temporal resolution features of the present invention may be used to provide slow motion images, sped-up images, frame-by-frame visualization, frame synchronization and comparison techniques, and other temporal manipulations.

Accordingly, one embodiment of the present provides a monitoring system to monitor a sporting event. The monitoring system includes a monitoring device to monitor predetermined characteristics of the sporting event and to collect monitored data. The predetermined characteristic of the sporting event may be time-sequenced images of the sporting event or some aspect of the sporting event, such as a collection of images that makes up a motion picture, or other characteristics. Of course, multiple monitoring devices may be used to monitor different aspects of the sporting event, or to monitor the same aspect of the sporting event in a different manner. For example, one monitoring device may monitor the aspect of an offensive line formation during a football play, while during the same play another monitoring device may monitor a receiver in motion. Additionally, multiple monitoring devices may be used to monitor the same aspect of the sporting event, for example, by viewing the same aspect of the sporting event with different spatial resolution or with different temporal resolution. Each monitoring device addresses an aspect of interest of the sporting event and monitors and collects monitored data in real time relative to the aspect of interest.

The monitoring devices may be used to collect images of the sports event relevant to sporting event criteria such as team execution, individual player execution, rules review, play officiating, offensive tactics, defensive tactics, game strategy, statistical measures, and coaching. The monitoring device may include a video camera transmitting a continuous stream of video images or a single fixed digital photo image camera, or other suitable monitoring devices. The video camera may transmit video streams using a standardized format such as an NTSC output or PAL output, or it may be any digital streaming format such as SD-SDI, HD-SDI, SMPTE (D1-D9), HDCAM, MPEG2, MPEG4 or any encoding format and transmission protocol. The video camera may transmit video streams using a plurality of pixel resolution characteristics and a plurality of available variable temporal resolution characteristics.

Similarly, the single fixed digital photo image camera may monitor, acquire, and transmit digital images using a number of pixel resolutions and photo time delays, including inter photo time delays. The photo image camera may be triggered by the controller (described below) to acquire an image or by any number of other means. For example, a user may generate a trigger to cause the photo image camera to acquire an image, a formatted data stream may be used to cause the photo image camera to acquire an image, an external event may be used to trigger the photo image camera to acquire an image, and the like.

Additionally, the monitoring device of the present invention may include a computerized game information system with a formatted data stream relevant to the monitored sporting event. The computerized game information system may communicate sporting event game information data to the controller. The computerized game information system may provide simulated action relevant to the monitored sporting event. Likewise, the computerized game information system may provide supplemental data to augment the monitored sporting event, including text data and visual supplemental data and the like.

The monitoring system may include a converter to process the monitored data into digitized data frames having a defined size. The monitoring system may also include a digital data memory storage device adapted to receive and store the monitored data in a random access storage buffer. The monitored data may be stored as a plurality of time-stamped digitized data frames with unique addresses, and the digital data memory storage device is capable of both time shifting and relational association of the digitized data frames. Time shifting may be performed in conjunction with slow motion or fast motion image processing and the like, and relational association may include time stamping the digitized data or otherwise synchronizing the digitized data frames. The size of the digitized data frames may be variable or of a fixed length, size, or capacity. Further, relational association may include matched time stamps or other means of providing synchronization and timing characteristics to the digitized data frames.

The monitoring system may also include a controller to control the monitoring system. The controller communicates with the digital data memory storage device and the monitoring device, and the controller may extract a digitized data frame according to a predetermined criterion, such as a particular time that the digitized data frame was acquired, an elapsed time, a criterion of the aspect of the monitored sporting event, such as team execution, individual player execution, rules review, play officiating, offensive tactics, defensive tactics, game strategy, statistical measures, coaching, and the like. The monitoring system may also include a viewing device that is in communication with the digital data memory storage device and the controller. The viewing device may be used to select, manipulate, view, and analyze the extracted digitized data frame and the collected data.

The monitoring system of the present invention may also include an optional event controller that distributes time stamped event information generated by changes in the monitoring device. Similarly, an event database for storage and relational association of the sporting event may also be included.

Also, monitoring system of the present invention may include optional additional monitoring devices, where each monitoring device addresses an aspect of interest of the sporting event at a different location of the sporting event and/or addresses the same aspect of the sporting event using different features or characteristics with which to monitor the event.

The present invention also includes a method for monitoring a sporting event. The method includes monitoring pre-determined characteristics of the sporting event with a monitoring device and collecting monitored data from the monitoring device, where the monitored data addresses an aspect of interest of the sporting event. The monitored data may be collected in real-time relative to the aspect of interest and transmitted using a continuous stream of video images from a video camera. As indicated above, a video camera may transmit a plurality of available pixel resolutions as well as a plurality of available temporal resolutions.

As also indicated above, the method of monitoring a sporting event may further include monitoring an additional aspect of interest of the sporting event using an additional monitoring device, where each monitoring device addresses an aspect of interest from a different location of the sporting event and/or a different aspect of interest of the sporting event from the same location.

Also, the monitoring of pre-determined characteristics of the sporting event may include computerized game information that is relevant to the monitored sporting event. The computerized game information may include a formatted data stream or other suitable input feed. The method may also include communicating sporting event game information data to the controller using a computerized game information system.

Likewise, the method of monitoring a sporting event may include using a single fixed digital photo image camera. The single fixed digital photo image camera may vary pixel resolution and/or inter photo time delay and may be triggered to acquire an image by a user-initiated action, an external event, a formatted data stream, the controller, and other means.

The method of the present invention further includes converting the monitored data into digitized data frames having a defined size and receiving and storing the monitored data in a random access storage buffer of a digitized data memory storage device. In the case of a video stream, the converter may convert the video stream, such as a video stream using a standardized digital format into digitized frames. The random access storage buffer includes time stamped digitized data frames with unique addresses. The method of the present invention may also time shift the digitized data frames using the storage device and/or perform a relational association upon the digitized data frames using the digitized data memory storage device. Additionally, the digital photo image may be further processed into a standardized storage format such as XML, CODAS, SFF, HDF, BD, DVD, HD DVD, and the like using the converter. The method may be used such that the size of the digitized data frames varies in size, length, or capacity and where the relational association includes matched time stamps or other methods of synchronizing the data frames.

The method for monitoring a sporting event may also include distributing time stamped event information generated by changes in the monitoring device.

The method also includes extracting a digitized data frame from the digital data memory storage device according to a predetermined criterion and selecting, manipulating, and viewing the extracted digitized data frame and the collected monitored data on a viewing device. The criterion may be a particular time that the digitized data frame was acquired, an elapsed time, or a criterion of the aspect of the monitored sporting event, such as team execution, individual player execution, rules review, play officiating, offensive tactics, defensive tactics, game strategy, statistical measures, coaching, and the like.

These and other advantages, aspects, and features of the present invention will become more apparent from the following detailed description of embodiments and implementations of the present invention when viewed in conjunction with the accompanying drawings. The present invention is also capable of other embodiments and different embodiments, and details can be modified in various respects without departing from the spirit and scope of the present invention. Accordingly, the drawings and descriptions below are to be regarded as illustrative in nature, and not as restrictive.

DETAILED DESCRIPTION OF THE INVENTION

As will be evident from the discussion below, the present invention provides a data recording and playback system for video capture of sporting events that avoids the disadvantages of prior systems by allowing easy and rapid viewing of the recorded data and by allowing analysis and replay of a time sampled signal.

Reference is made below to embodiments of the present invention, examples of which are illustrated in the accompanying drawings, where like reference numerals refer to like elements throughout. The embodiments are described below to explain the present invention by referring to the Figures.

As used in this application, the terms "a", "an" and "the" may refer to one or more than one of an item. The terms "and" and "or" may be used in the conjunctive or disjunctive sense and will generally be understood to be equivalent to "and/or".

Embodiments of the present invention provide video or image capture for sports applications. The video capture system and method of the present invention may store video, video segments, or images of sports events or sports plays for game time analysis by users, such as coaches and players. The video capture system may include cameras connected to video servers. The video capture system may continuously sample live camera signals and other outputs, and the video servers may digitize and save each frame of a game. As a play occurs, the coach or video assistant, for example, may watch the live action and press a capture button to save an image for archiving. In the case of a video output, a button marking the beginning of a play, for example, may be pressed and that button may be pressed again to mark the end of the play, thereby creating a video segment. The coach and players may collaboratively review the images or the video or video segments, each on their own viewer. One or more designated viewers may telestrate the image or video with lines and other symbols to highlight the play's important aspects. Telestration includes, for example, illustrating images or videos with line drawings, text, or other annotations, clarifying action in the image or video. Additional annotations may be in the form of audio comments or commentary that may be recorded and/or synchronized to the video or video segment. The other users may observe the illustration at the same time they hear the accompanying audio or verbal commentary. A database may store the image and annotations as well as other attributes of the play, such as the time of the play, which team had possession, the type of play, and other sport specific information or criteria.

Embodiments of the present invention provide advantages over existing systems. With the system and method of the present invention, full color images or videos may be available for review almost immediately, for example, in less than one second. The image resolution may be at least 640×480 pixels. Telestration drawings may be added to images or videos and altered as desired. A video capture system may be networked giving image access to many users over the network. A wireless network may give considerable flexibility to users on a playing field. Collaboration capabilities may allow individuals on the field and in the booth, for example, to both audibly and visually share in the discussion of an image or video. Telestration drawings may be reviewed by all users as they are drawn, regardless of their physical location, enhancing the quality of discussion. Images or videos may be labeled with time, camera position, type of play, and other attributes to provide additional information with regard to the sporting event. Telestration may be saved and may be altered at any time. Database functions may allow for easy organization and classification of images or videos. Images or videos may be digitally zoomed and otherwise manipulated for enhanced viewing.

Figure 1:
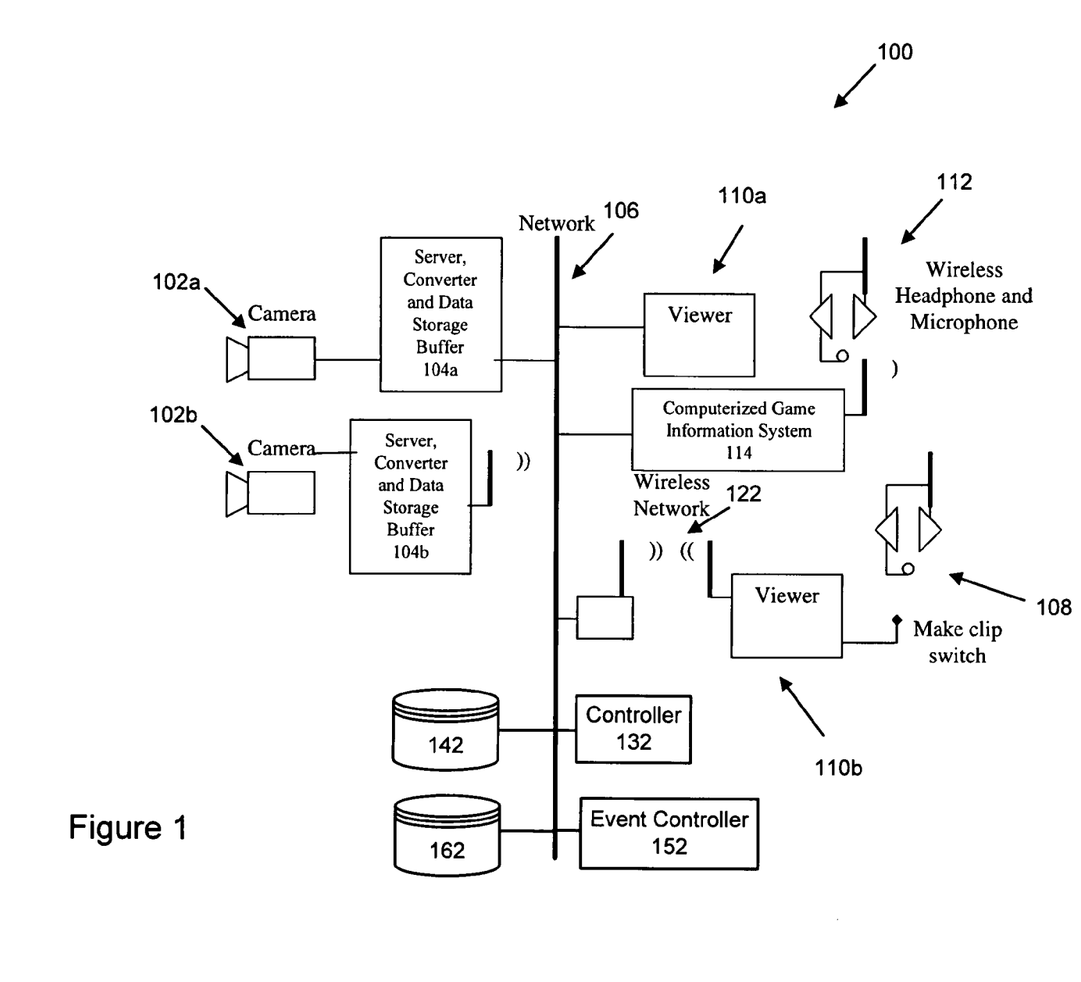
FIG. 1 is a schematic representation of the hardware architecture of a video capture system/monitoring system according to one embodiment of the present invention.

FIG. 1 is a schematic illustration of a video capture system 100 in accordance with one embodiment of the present invention. It should be initially noted that the video capture system 100 of FIG. 1 may be implemented with any type of hardware and software, and may be a pre-programmed general purpose computing device. For example, the video capture system 100 may be implemented using a server, a personal computer, a portable computer, a thin terminal, a hand held device, a wireless device, or any combination of such devices. The video capture system 100 may be a single device at a single location or multiple devices at a single location, or multiple devices at multiple locations that are connected together using any appropriate communication protocols over any communication medium such as electric cable, fiber optic cable, any other direct connection, or in a wireless manner using radio frequency, infrared, or other technologies.

In the illustrated embodiment of FIG. 1, the video capture system 100 is connected to a network 106 that allows remote access to the video capture system 100 so that data and sporting event information can be received, and so that event data corresponding to a predetermined or selected criterion can be retrieved from the system. The network 106 allows the video capture system 100 to interact with remotely located viewers 110. The network 106 may be any type of communications channel, such as the Internet, a local area network (LAN), a wide area network (WAN), direct computer connections, and the like, and may be connected in a wireless manner using radio frequency, infrared, or other communication technologies, using any type of communication hardware and protocols. The viewers 110 may use monitors and review devices employing a server, a personal computer, a portable computer, a thin terminal, a hand held device, a wireless device, and any other computing devices, or any combination of such devices.

It should also be noted that the video capture system 100 in accordance with one embodiment of the present invention is illustrated and discussed herein as having a plurality of modules and/or components that perform particular functions. It should be understood that these modules are merely schematically illustrated based on their function for clarity purposes only and do not necessary represent specific hardware or software. In this regard, these modules and/or sub-modules may be implemented as hardware and/or software to substantially perform the particular functions explained. Moreover, two or more of these modules may be combined together within the video capture system 100, or divided into more modules based on the particular function desired. Thus, the present invention as schematically embodied in FIG. 1 should not be construed to limit the video capture system 100 of the present invention.

FIG. 1 is a schematic representation of the hardware architecture of a video capture system/monitoring system 100 according to an embodiment of the present invention. The hardware of video system 100 may be used to create a video clip, for example, of a portion of a sporting event such as a game, or a play during the game, or the like. The hardware of video system 100 may include a monitoring device, such as a camera 102 or game information system 114, as well as a video server 104, a network 106, a make clip switch 108, a viewing device, such as a viewer 110, a headphones/microphone combination 112. The video capture system 100 may also include a storage device, such as digital data memory storage device 142 that is adapted to receive and store monitored data. The monitored data may be stored in a random access storage buffer as a plurality of time-stamped digitized data frames with unique addresses or in other suitable storage means. Additionally, digital data memory storage device 142 is capable of both time shifting and relational association of the digitized data frames. Controller 132 provides control of the video capture system 100 and is in communication with the other devices, including digital data memory storage device 142, camera 102, game information system 114, converter/server 104, make clip switch 108, viewer 110, headphone/microphone combination 112, and other devices via network 106.

Monitoring system 100 may also include an event controller 152 that distributes time stamped event information generated by changes in the monitoring device, such as camera 102. Further the monitoring system 100 may include an event database 162 for storage and relational association of the sporting event. Event database 162 may be a physically separate database, or it may be integrated with other databases in accordance with the system and method of the present invention.

The camera 102 may monitor a predetermined characteristic of the sporting event and collect monitored data. In one embodiment, the predetermined characteristic may be one image sequenced in time, and the image may be relevant to team execution, individual player execution, rules review, play officiating, offensive or defensive tactics, game strategy, statistical measures, coaching, or other criteria. The camera 102 may address an aspect of interest of the sporting event. As indicated above, multiple cameras (shown as 102a, 102b) may be used to address and monitor different aspects of the sporting event or to address and monitor the same aspect of the sporting event in a different manner. For brevity, in the cases where multiple devices may be utilized to practice the system and method of the present invention, the multiple devices may be referred to in a singular fashion. For example, in the below discussion, cameras 102a, 102b, as well as servers 104a, 104b, and viewers 110a, 110b, may be referred to as camera 102, server 104, and viewer 110, respectively.

The camera 102 may operate in real-time relative to the aspect of interest. The camera 102 may capture video or a single fixed digital photo image. In the case of a single fixed digital photo image camera, the camera 102 may be capable of varying pixel resolution and inter photo time delays. The camera 102 may include a standard analog output such as an NTSC output or PAL output, or it may be any digital streaming format such as SD-SDI, HD-SDI, SMPTE (D1-D9), HDCAM, MPEG2, MPEG4 or any encoding format and transmission protocol. The camera 102 may output a video output, for example, a continuous stream of video images. In one embodiment, video feeds from television coverage of a sporting event may additionally or alternatively be utilized. The camera 102 may be capable of varying pixel and temporal resolution. In an embodiment applicable to football, a camera may be positioned to view the field from an end zone, and another camera may be positioned to view the field from a sideline.

The game information system 114 is a monitoring device that provides a formatted data stream relevant to the monitored sporting event. The computerized game information system 114 may communicate sporting event game information to a controller 132. The embedded game information system information may be combined with the time stamped data derived by other monitored means, such as the video camera 102, to provide additional attributes which may relate to football, for example, and may include the day and time of a play, the offensive and defensive team names, the current quarter and down, which team had possession, the type of play, and other sport specific information. One or more game information systems 114 may be incorporated in the monitoring system 100 of the present invention.

The video server 104 may include a computer including a frame capture board that digitizes and compresses each frame of the video output. The video server 104 may digitize and compress video streams into a standardized format. In one embodiment, NTSC video signals may be digitized at 640× 480 pixels at 60 frames per second. An event controller 152 distributes time stamped event information generated by changes of the camera 102. Compressed frame data and a time stamp may be stored in a circular buffer in server 104 or in a physically separate location. The time stamps allow for synchronization of video outputs from multiple video servers 104. Each frame may include a unique address. The circular buffer is capable of time shifting and relational association of the frames. The video server 104 may maintain a database of attributes of each frame, each video clip, or each video. These attributes may be sport specific or may otherwise be categorized for analysis, retrieval, and archiving. For example, these attributes may relate to football and may include the day and time of a play, the offensive and defensive team names, the current quarter and down, which team had possession, the type of play, and other sport specific information. Configuration software on the video server 104 allows for selection of a frame rate and buffer rate.

The hardware of the video capture system 100 may communicate over the network 106. The network 106 may include a local area network, a wide area network, or a wireless network. In one embodiment, the wireless network may include an 802.11b wireless network 122. Data sent over the wireless network 122 may be encrypted to prevent interception by unintended recipients, such as the opposing team.

The make clip switch 108 may be used to provide a make clip signal to identify a video segment, such as a video clip. An administrator may watch the field of play and may press a button such as make clip switch 108 to mark the beginning of a play and may press the button again to mark the end of the play. The make clip signal may also be provided by a time synchronized input from the game information system 114.

The viewer 110 may be a computer and may provide the primary interface for the monitoring system 100. The viewer 110 provides the ability to select, manipulate, and extract an image or a video. The viewer 110 may be any appropriate computer. For example, the viewer 110 may be a tablet type computer to facilitate easy portability. The software incorporated in viewer 110 may be designed with computer-executable instructions to perform a method of the present invention in such a manner that no keyboard may be required. Interface actions may be accomplished with mouse movements or touch screen movements with a finger or stylus. Similar functionality may be employed using a suitable handheld device as viewer 110. Viewer 110 may connect over the network 106 to each video server 104 to display a selected image or video clip.

Viewer 110 may also connect to other viewers to establish a master/slave relationship where the image selection and real time animations drawn by a master computer may, as they are drawn, be displayed on slave computers. Likewise, multiple viewers may collaborate in real-time by providing complementary annotations to the images and video segments being reviewed. Each viewer may have the functionality to provide annotation, such as Telestration, audio commentary, and other means of annotating the images and video segments. Alternatively, a coach may wish to permit annotation by only one viewer at a time, and may selectively disable annotation functionality at selected viewers.

The headphones/microphone combination 112 may be wireless or hard wired to the monitoring system 100 via network 106. Players and coaches may communicate using headphones/microphones combination 112 to allow audio communication and collaboration in addition to the video communication enabled by the viewers 110.

Figure 2:
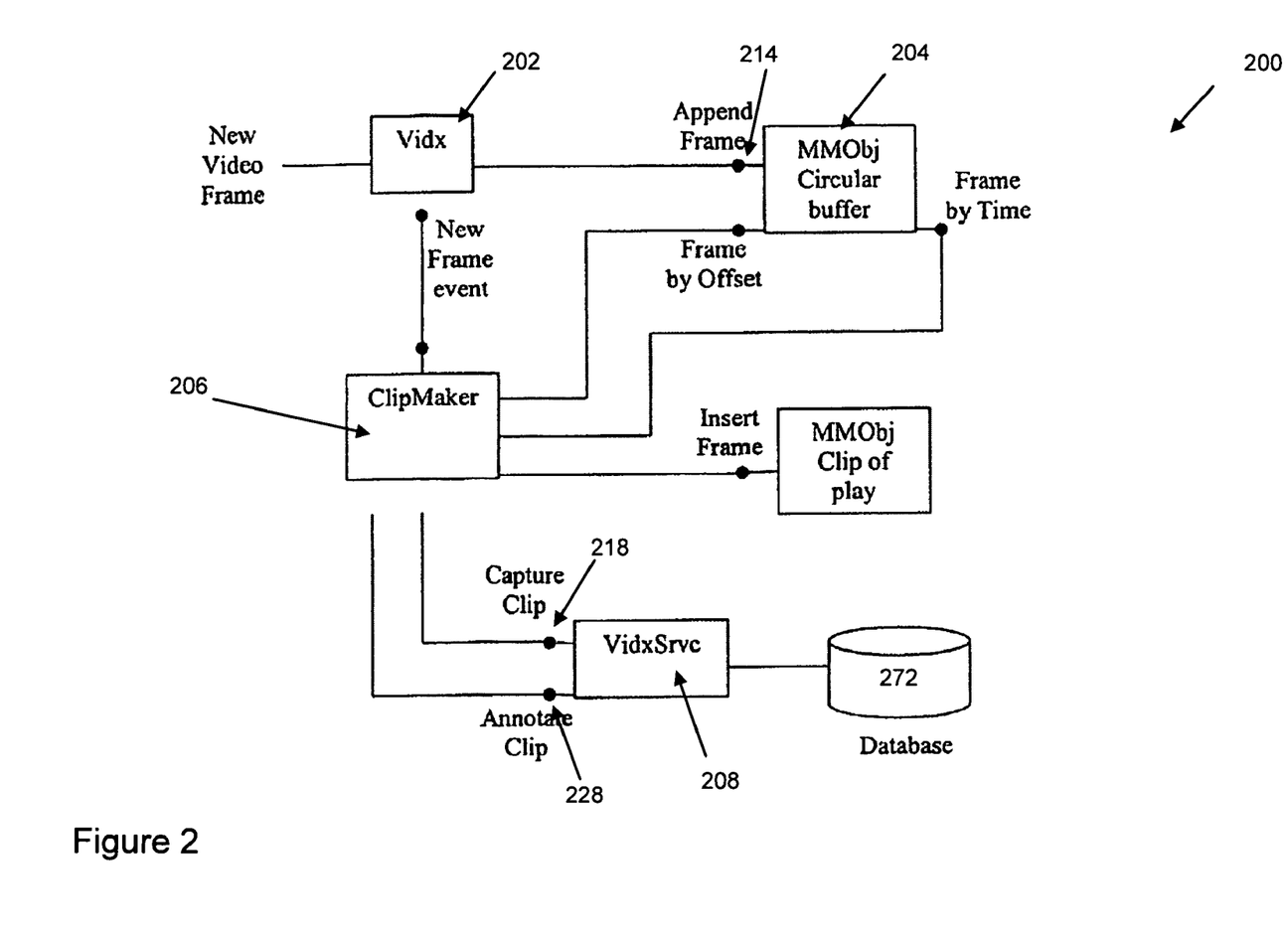
FIG. 2 is a schematic representation of a software architecture to perform a method of the present invention to write video frames to a real-time buffer of a video server.

FIG. 2 is a schematic representation of a software architecture 200 that includes computer-executable instructions to perform a method of the present invention in such a manner as to write video frames to a real-time buffer of a video server, such as the video server 104 of FIG. 1. The software architecture 200 may include a Vidx object 202, a MMObj object 204, a ClipMaker object 206, and a VidxSrvc object 208.

As mentioned previously, these objects and modules are merely schematically illustrated based on their function for clarity purposes only and do not necessary represent specific hardware or software. In this regard, these modules and/or sub-modules may be implemented as hardware and/or software to substantially perform the particular functions explained.

The Vidx object 202 may manage the flow of digitized and compressed video frames from a data capture board or a frame capture board in the video server 104 that receives its input from camera 102. When the frame capture board device driver indicates that it has a new frame available, the Vidx object 202 sends the frame to an append frame method input 214 of the MMObj object 204 for storage in the circular buffer. The Vidx object 202 may also send a message to the viewer 110 indicating that a new frame has been added to the buffer.

The MMObj object 204 manages data in and out of the video files. The video data may be stored as a memory mapped file. The MMObj object 204 may maintain pointers to the oldest and newest frames in the buffer and may manage allocation of space when old frames must be discarded to make room for new frames. The MMObj object 204 may supply frames to other objects to save or to display them. The frames may be requested by time stamp or as a frame count offset from the previously requested frame. The real-time MMObj object 204 may store every frame of a game, for example. Additional MMObj objects 204 may be created for each play video, for example.

The ClipMaker object 206 saves frames to a new file when the selected video clip is made. When the ClipMaker object 206 receives a "begin" message, it may first create another MMObj object 204 to store the selected frames and then request the frames from the real-time MMObj object 204 on each new frame event from the Vidx object 202. As each new frame is available, the ClipMaker object 206 may write it into the play video MMObj object 204.

The VidxSrvc object 208 writes data into a local database 272 about each clip. When the clip is requested, the ClipMaker object 206 may call a capture clip method 218 to store base information about the clip, such as time stamp and video priorities. The annotate data method 228 may store additional play information from other monitored means.

Figure 3:
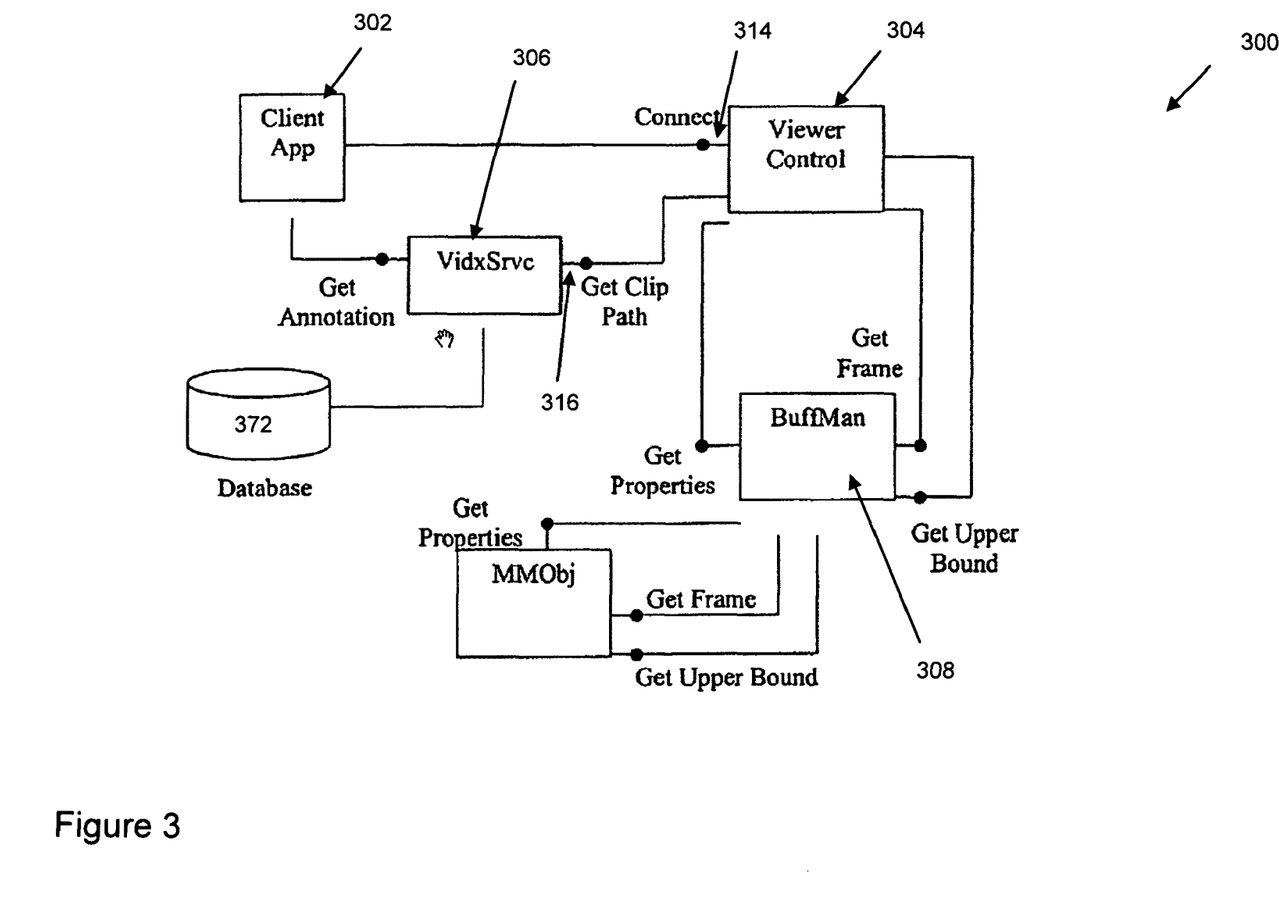
FIG. 3 is a schematic representation of a software architecture to perform a method of the present invention to display video on a viewer.

FIG. 3 is a schematic representation of the software architecture 300 that includes computer-executable instructions to perform a method of the present invention in such a manner as to display video on a viewer 110 of FIG. 1. The software architecture 300 may include a client application 302, a ViewerControl object 304, a VidxSrvc object 306, and a BuffMan object 308.

The client application 302 creates a ViewerControl object 304 to display the video. Additional controls in the client application 302 may allow the selection of the real-time buffer or a specific play clip to display and to establish a master/slave relationship between multiple viewers 110.

The ViewerControl object 304 may include a window to display the video and user controls to play a video in a forward or reverse direction. The video may be played at various speeds from a single step frame-by-frame to a fast motion. Based on a user selection, the client application 302 may instruct the ViewerControl object 304 as to which video to play, such as real-time buffer or play clip. The ViewerControl object 304 may then get the path to the video file from get clip path 316 of the VidxSrvc object 306. The ViewerControl object 304 may also create a BuffMan object 308 that connects to the actual video file. Based on video player controls in viewer 110, the video may be played in the window by repeatedly retrieving the next frame to display from the BuffMan object 308.

The VidxSrvc object 306 retrieves data from a local database 372 about each clip. Before the ViewerControl object 304 may display a clip, the ViewerControl object 304 may retrieve the path to the actual video file from the VidxSrvc object 306. The VidxSrvc object 306 may pass sport related information about the clip to the application for display as well.

The BuffMan object 308 may be a service running on the video server 104 that provides remote access to the actual memory mapped file (MMOjb 204). The BuffMan object 308 retrieves all of the video properties of the file such as frame size in pixels, frame rate, and the like, from the MMObj 204 and may pass them on to the ViewerControl object 304 so that the video may be displayed properly. The BuffMan object 308 may provide each frame for display by time, offset from previous frame, or by upper bound. The upper bound access may retrieve the most recent frame from the real-time MMObj object 204 for real-time display.

Figure 4:
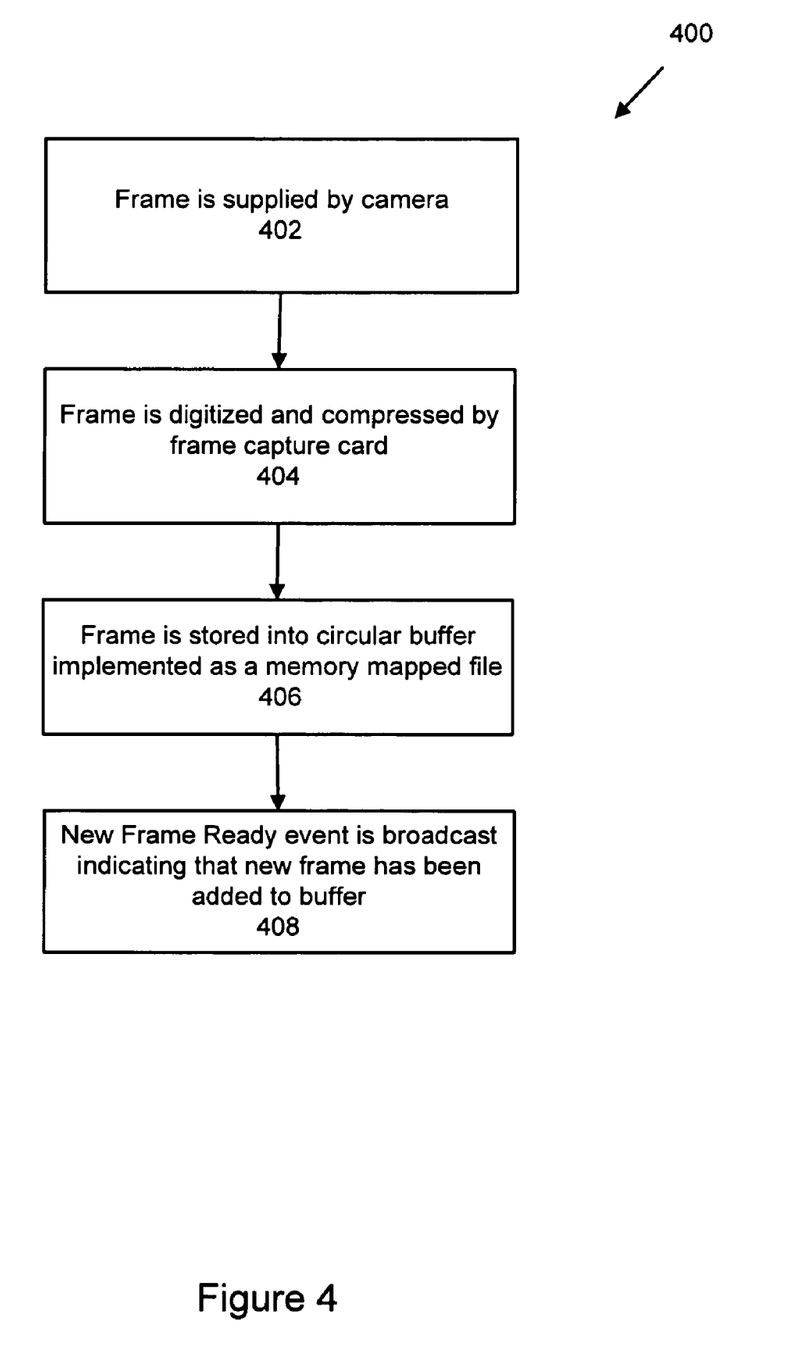
FIG. 4 is a schematic representation of a method of storing video frames according to one embodiment of the present invention.

A method of operation of one embodiment of the video capture system 100 of the present invention is described with reference to FIGS. 4-6. FIG. 4 illustrates a method 400 of storing video frames according to one embodiment of the present invention. In step 402, camera 102 supplies a frame to video server 104. In step 404, the frame is digitized and compressed by the frame capture card of the video server 104. In step 406, the frame is stored in the circular buffer of the video server 104. The frame may be stored as a memory mapped file or in another suitable manner of storing the frame for analysis, manipulation, and retrieval. In step 408, a new frame ready event is broadcast to indicate that a new frame has been added to the buffer.

Figure 5:
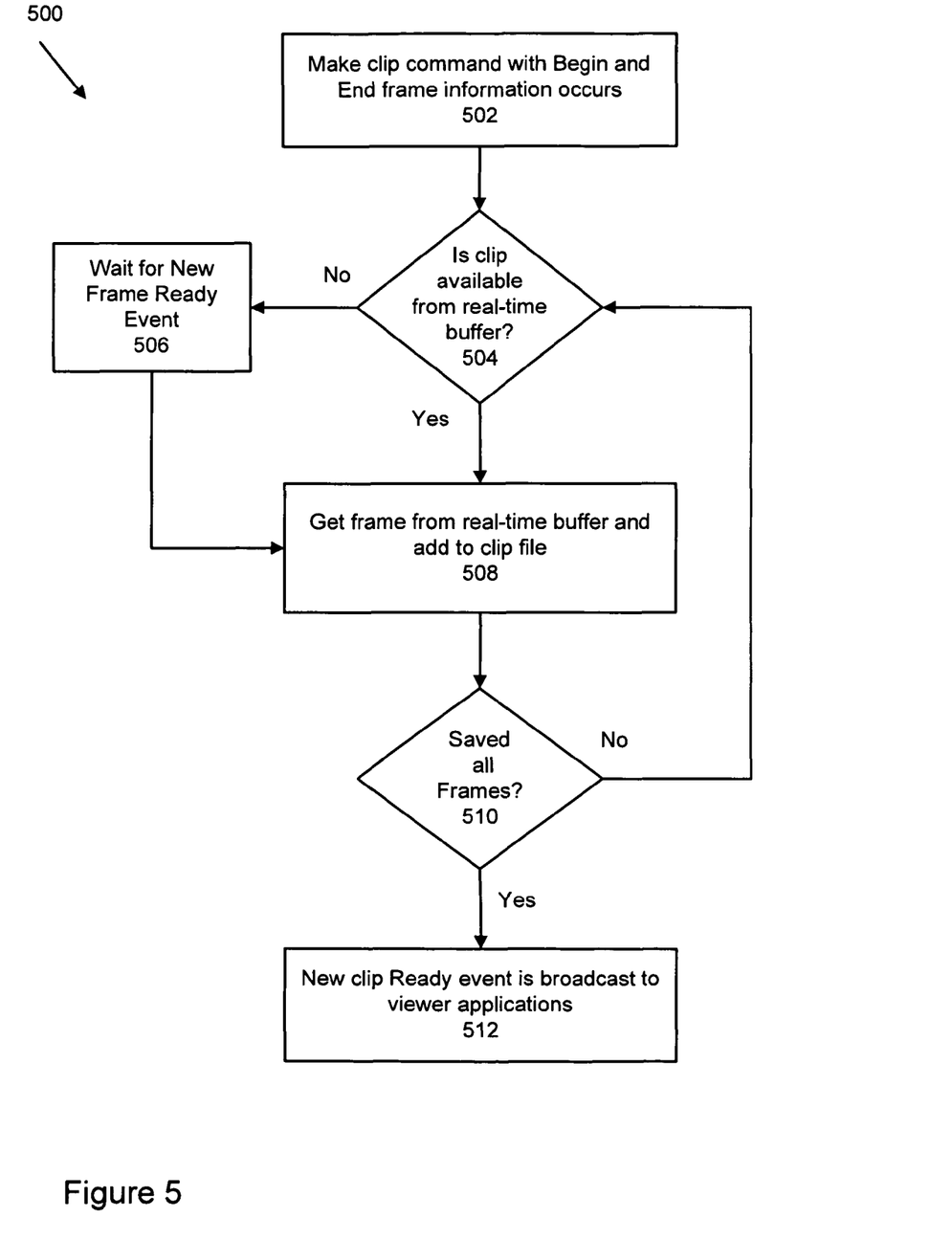
FIG. 5 is a schematic representation of a method of creating video clips according to an embodiment of the present invention.
Figure 6:
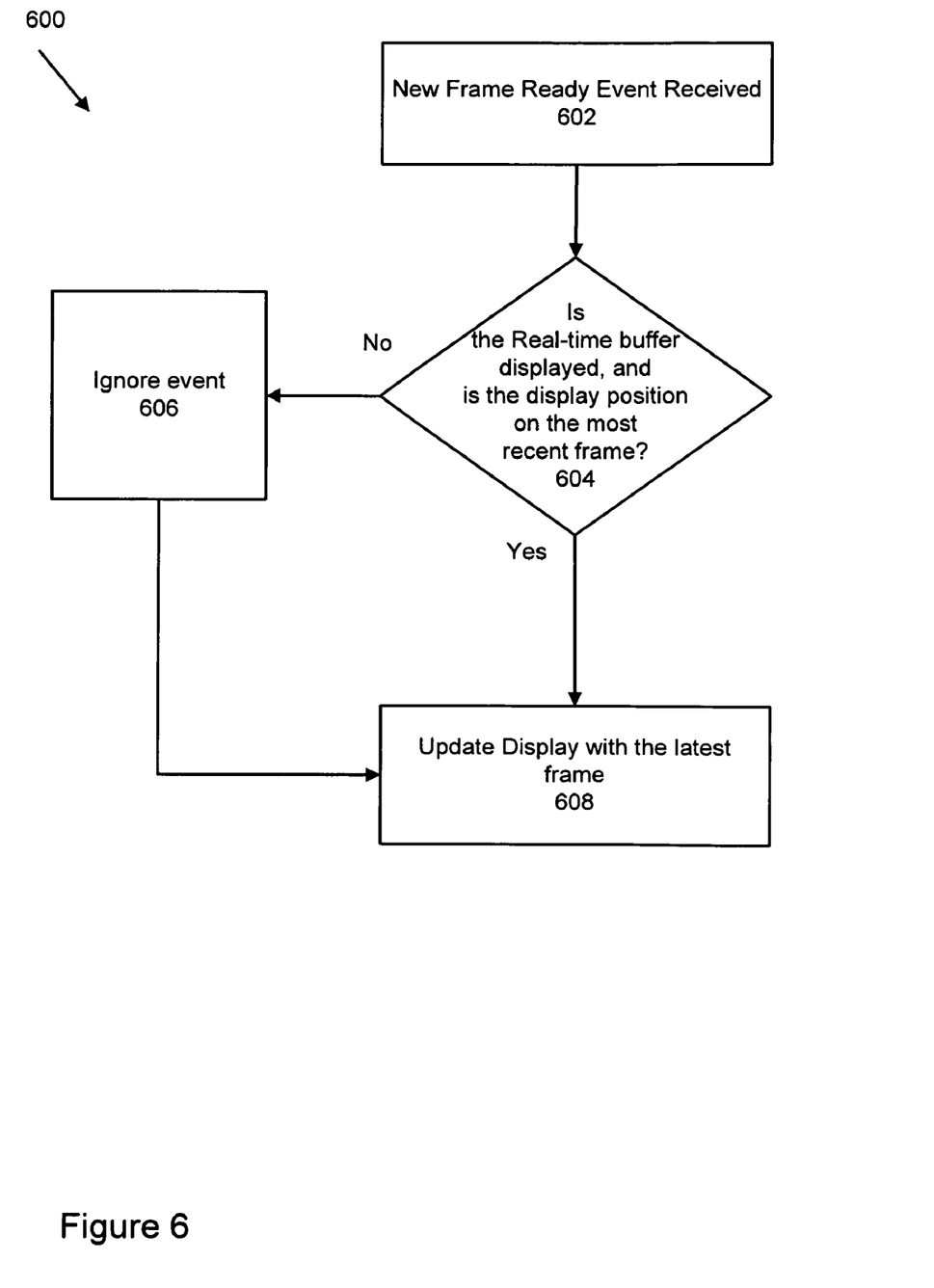
FIG. 6 is a schematic representation of a method for displaying live video according to one embodiment of the present invention.

FIG. 5 is a schematic representation of a method 500 of creating video clips according to one embodiment of the present invention. In step 502, a make clip command with begin and end information occurs. In step 504, a determination is made as to whether the clip is available from the real-time buffer. If, in step 504, the system and method of the present invention determines that the clip is not available from the real-time buffer, the method 500 proceeds to step 506. In step 506, the method 500 waits for a new frame ready event. If, however, in step 504, the system and method of the present invention determines that the clip is available from the real-time buffer, the method 500 proceeds to step 508. In step 508, a frame is obtained from the real-time buffer and added to the clip file. In step 510, the system and method of the present invention determines whether all frames have been saved. If, in operation 510, the system and method of the present invention determines that all frames have not been saved, the method 500 returns to step 504. If, however, in step 510, the system and method of the present invention determines that all frames have been saved, the method 500 proceeds to operation 512. In operation 512, a new clip ready is broadcast to viewer applications.

Figure 7:
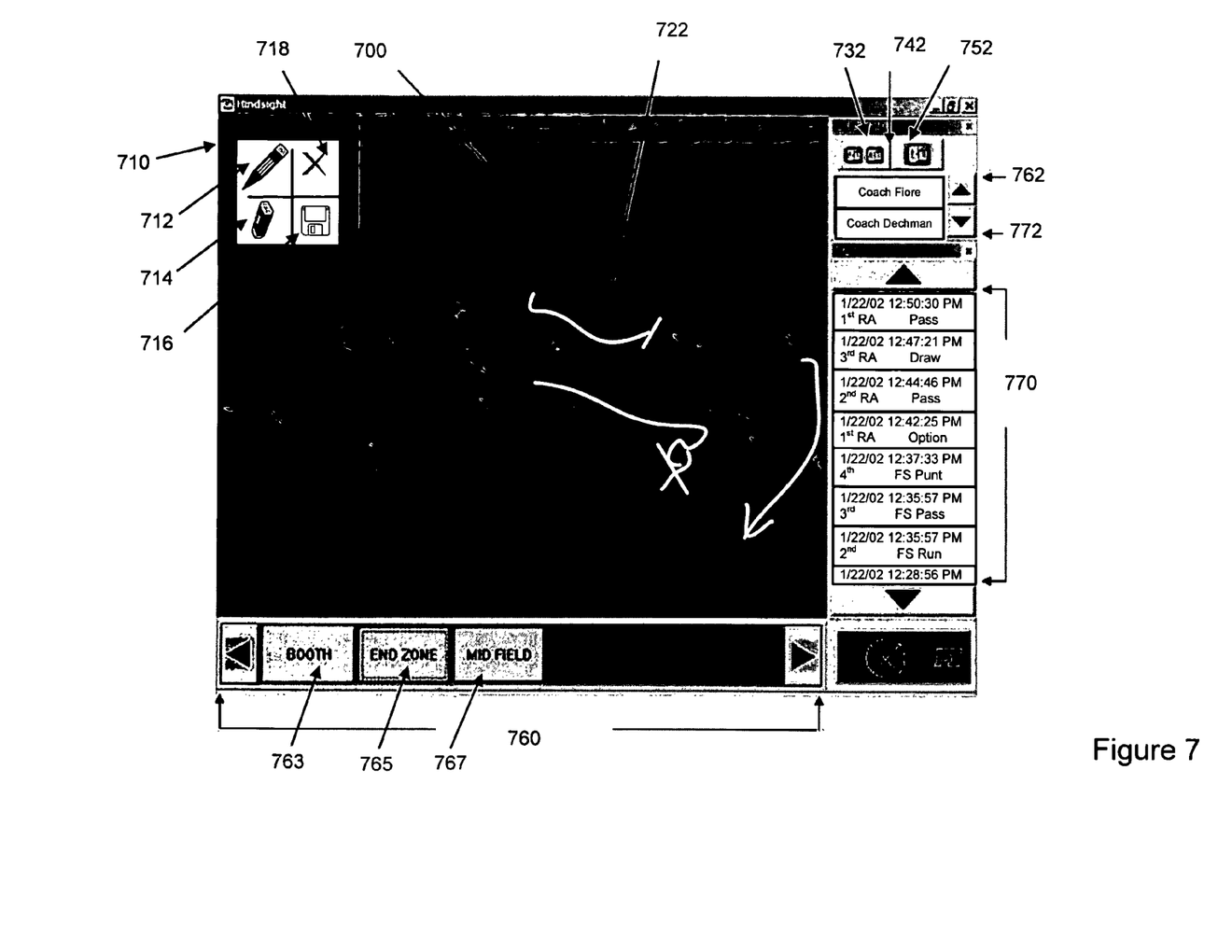
FIG. 7 is a screen shot of a computer interface of a viewer in accordance with one embodiment of the present invention.

In one embodiment of the present invention, a video capture system and monitoring system may include a Telestration mode. When a user selects the Telestration mode, a toolbar 710 may appear with draw 712, erase 714, and save 716 buttons as shown in FIG. 7. When the draw 712 button is pressed, the application may wait for a mouse left button down event to indicate the beginning of drawing. The x and y position of the mouse may be captured and a list of positions may be created. As mouse move events occur while the left mouse button is still down, the x and y mouse positions may be added to the list and a line may be drawn from the previous mouse position to the new mouse position. This way, a free-hand line 722 may appear on the drawing as the mouse is moved. Lifting the mouse left button may stop the list update and the line may be complete. As many lines as desired may be added to the drawing. The list of x and y positions may be stored in the frame annotation storage in the clip file.

In an embodiment, viewers 110 may be linked to enable collaborative viewing of images. One of the viewers 110 may be designated as a master and may control the operation of all of the slave viewers 110 in session with the master. All user actions on the master viewer 110, including camera, play video selection, and Telestration actions may also be visible on the slave viewers 110. The master viewer 110 may perform the image selection and real time animations and display the annotated images on the slave computers. When used in conjunction with headphones/microphone 112, collaborators may both verbally and visually review video. By using the mode buttons, users may easily join or exit a session or swap master and slave roles. Likewise, multiple viewers may collaborate in real-time by providing complementary annotations to the images and video segments being reviewed. Each viewer may have the functionality to provide annotation, such as Telestration, audio commentary, and other means of annotating the images and video segments. Alternatively, a coach may wish to permit annotation by only one viewer at a time, and may selectively disable annotation functionality at selected viewers.

Mode buttons 732, 742 may control the operational mode of the viewers 110. Pressing the master button 732 may make that viewer an available master. In one embodiment of the present invention, this action sends an "add master" event to all viewers 110, and the name of that viewer 110 appears in the other viewers' collaboration lists. The current state of the display may then be stored in the database. Pressing the master button again may send a delete master event to all viewers and the name of that viewer 110 may disappear from the collaboration list 762, 772 of the other viewers. When in master mode, the master viewer 110 may broadcast events indicating its name and the state of its clip and camera selection. When in Telestration mode, the master viewer 110 may also broadcast changes in the Telestration drawings. Slave viewers may receive these messages and display the identical items.

Pressing a slave button 742 may remove a viewer 110 from master mode if it was previously in master mode by broadcasting a delete master message. A user may then select a master from the master list 762, 772 and fetch the current display status of the master from the database. The user may then switch his display to match the master's altering of the play video list selection and camera selection accordingly. When the user receives a camera or clip selection change message or a Telestrator change message from the master, it may update its display. Pressing the slave button again toggles the state back to independent operation.

In one embodiment of the present invention, a user may view the contents of the real-time buffer of an entire game. The user may seek and access any point in the file and play the video just like any single frame image or video clip. The real-time buffer has an additional feature such that when the playback position of the buffer is at the most recent point in time, the buffer displays the live video frames from the selected camera. FIG. 6 is a schematic representation of a method 600 for displaying live video according to one embodiment of the present invention. In step 602, a new frame ready event is received. In step 604, the system and method of the present invention determines whether the real-time buffer is displayed and whether the display is positioned on the most recent frame. If, in step 604, the system and method of the present invention determines that the real-time buffer is not displayed or that the display is not positioned on the most recent frame, the method 600 proceeds to step 606. In step 606, the event is ignored. If however, in step 604, the system and method of the present invention determines that the real-time buffer is displayed and that the display is positioned on the most recent frame, the method 600 proceeds to step 608. In step 608, the display is updated with the latest frame.

FIG. 7 is a screen shot of a software interface of a viewer, such as the viewer 110 of FIG. 1. Controls on the software interface allow a user to select a camera view, an image or video, and control system operation. An image or video may be displayed in an image display portion 700 of the software interface. Telestration tools may be invoked, for example, by double clicking a left mouse button, or double tapping on a touch screen in the case of a tablet computer. The camera selection bar 760 may contain a set of buttons 763, 765, 767 corresponding to different camera positions such as booth, end-zone, and mid-field. Selecting one of these buttons 763, 765, 767 connects the viewer to the video server for that particular camera, and the selected image or video from that camera is displayed. A visual or other indication may be provided to communicate to the user which camera is being displayed.

The software interface may include a play list 770. The play list 770 may show available play images or videos. Each play may be labeled with the date and time the play was captured and a short annotative description of the play. In one embodiment of the present invention, clicking with the left mouse button or tapping on the tablet on one of the list entries displays that play in the image window 700. Double clicking or tapping on the item may invoke a menu where the play may be deleted or more extensive annotation may be added or viewed. Clicking or tapping on the arrows above and below the list box may scroll the contents of the list box.

The software interface may include a collaborators list 762, 772. The collaborators list may show available collaborators with which a user may establish a master/slave relationship. The list 762, 772 may be used in conjunction with mode buttons 732, 742, 752 which place a viewer in master, slave, or independent mode. For example, when in the slave mode, the user may select a collaborator from the list and view the same image and Telestrator illustrator illustration. This enables collaboration and discussion in which two or more parties are viewing the same information.

The software interface may include a Telestration toolbar 710 including, for example, draw 712, erase 714, save 716, and close 718 buttons. By selecting the draw button 712, a user may telestrate the image or video on the screen with lines 722 and other symbols using a mouse or the user's finger or a stylus. By selecting the erase 714 button, the user may erase all or part of a Telestrated line 722 or other symbol. By selecting the save 716 button, the Telestration may be saved for the image or video. By pressing the close 718 button, the Telestration toolbar 710 may be closed, and the Telestrator mode ends. When a viewer is in a master mode, Telestration appearing on the master viewer may be displayed on each slave viewer.

Various sports may have specific requirements or rules that make alternative embodiments of the present invention desirable. For example, according to some league rules, video accessibility may not be permitted during game time, and only still shot (single frames of video akin to a photograph) accessibility is permitted. In such alternative embodiments, video may be constrained to include a single frame, that is, a still image. As such, although every field of the entire game may be acquired and stored on the video server, because of league rules, only selected images may be accessible during the game. In the alternative, league rules may limit the buffer to a single image. In this case, the only monitored image available is the real-time image. The software architecture and file formats of the system of the present invention do not need to be altered to support either of these modes. Video playback controls are not needed as well. A single marker may be required to identify an individual frame to save. A controller, a user, a data stream, or an external event may be used to trigger image acquisition by the camera or other monitoring device. When a select command is received from a viewer in administrative mode, the selected image is saved, for example, in a standardized storage format such as a JPEG image file. In one embodiment of the present invention, the video server may continue to store fields even when an image is selected for display. In another embodiment, the "video server" may be limited to a single software module resident within the viewer device where it would receive real-time digitized images directly from digitizing cameras.

A user may mark the beginning frame and end frame in the buffer and select the "make clip" command, and a play clip may be made from the selected region of frames. An external trigger may be used to identify a video segment. One or more users may be designated as administrators, and an administrator may watch the field of play and press a button to mark the beginning of the play and press the button again to mark the end of the play. The specific locations of the controls on the display screen and interface may be sport dependent. For example, in football, the current offensive team may be selected by pressing a button having that team's name. The current down may be selected similarly.

In addition, it should be further noted that the above discussed embodiments are only examples of data recording and playback system of the present invention. In this regard, whereas in the particular embodiments discussed above, schematic illustrations were used to identify components associated to a particular function, in other embodiments of the present invention, various components may be used which perform one or more of the identified components. For instance, as noted previously, a disk drive may be used for the file system of the signal processor and the event database. In addition, in the networked embodiment of the present invention as shown in FIGS. 1 to 3, the network allows transfer and access of data utilized and stored by the monitoring system of the present invention. Consequently, it should also be evident that the various components of the signal processor, server and client devices may be arranged and/or combined in any appropriate manner. Thus, all such variations are also within the scope of the present invention.

Lastly, it should be noted that the disclosed monitoring systems and methods described herein can be readily implemented as software executed on a programmed general purpose computer, a special purpose computer, a microprocessor and associated communications equipment, or the like noted above. Furthermore, the disclosed method may be readily implemented in software using object or object-oriented software development environments that provide portable source code that can be used on a variety of computers, work stations, or modem hardware and/or software platforms. Thus, the present invention may be implemented in hardware and/or software using any known later developed systems or structures, devices and/or software by those of ordinary skill in the applicable art from the functional description provided herein and with a general basic knowledge of the computer and telecommunications arts.

While various embodiments in accordance with the present invention have been illustrated and described, they are not intended to be exhaustive or to limit the invention to the precise form disclosed. Those of skill in the art will recognize certain modifications, permutations, additions, and combinations of those embodiments are possible in light of the above teachings or may be acquired from practice of the invention. Therefore, the present invention also covers various modifications and equivalent arrangements that would fall within the purview of the appended claims and claims hereafter introduced.

What is claimed is:

1. A monitoring system to monitor a sporting event, the system comprising:
    a monitoring device to monitor predetermined characteristics of the sporting event and to collect monitored data, the monitoring device addressing an aspect of interest of the sporting event, and monitoring and collecting monitored data in real time relative to the aspect of interest;
    a converter to process monitored data into digitized data frames having a defined size;
    a digital data memory storage device adapted to receive and store the monitored data as a memory mapped file in a random access real-time storage buffer as a plurality of time-stamped digitized data frames with unique addresses, the digital data memory storage device capable of both time shifting and relational association of the digitized data frames when the digitized data frames vary in at least one of size, length, and capacity;
    a controller to control the monitoring system, the controller in communication with the digital data memory storage device and the monitoring device and determine when a digitized data frame is available from the real-time storage buffer, wait for a new frame ready event indicating that the digitized data frame has been added to the real-time storage buffer when the digitized data frame is not initially available from the real-time storage buffer and extract the digitized data frame according to a predetermined criterion when the digitized data frame is available from the real-time storage buffer;
    a viewing device in communication with the digital data memory storage device and the controller that selects, manipulates, and views the extracted digitized data frame and the collected data; and
    an annotation device providing real time annotated images and video segments appearing on the viewing device.

2. The system of claim 1, wherein the digital data memory storage device performs at last one of time shifting the monitored data and rationally associating the monitored data and wherein the predetermined characteristic of the sporting event is at least one image sequenced in time.

3. The system of claim 2, wherein the at least one image includes information of greater visual resolution or temporal resolution of the sports event and is relevant to sporting event criteria including at least one of team execution, individual player execution, rules review, play officiating, offensive tactics, defensive tactics, game strategy, statistical measures, and coaching.

4. The system of claim 1, wherein the monitoring device includes a video camera transmitting a continuous stream of video images.

5. The system of claim 4, wherein the video camera includes at least one of a plurality of available pixel resolution characteristics and a plurality of available variable temporal resolution characteristics.

6. The system of claim 1, wherein the converter converts video streams of a standardized digital format.

7. The system of claim 1, wherein the monitoring device includes a single fixed digital photo image camera.

8. The system of claim 7, wherein the single fixed digital photo image camera varies at least one of pixel resolution and inter photo time delay.

9. The system of claim 1, wherein the monitoring device includes a computerized game information system that provides a formatted data stream relevant to the monitored sporting event for combination with the plurality of time-stamped digitized data frames from the digital data memory storage device to provide attributes related to the sporting event.

10. The system of claim 1 further comprising:
    an event controller that distributes time stamped event information generated by changes in the monitoring device to synchronize outputs from a plurality of monitoring devices event.

11. The system of claim 10 further comprising: an event database for storage and relational association of the sporting event.

12. The system of claim 7, wherein the controller triggers the photo image camera to acquire an image.

13. The system of claim 7, wherein a user generates a trigger to cause the photo image camera to acquire an image.

14. The system of claim 7, wherein a formatted data stream triggers the photo image camera to acquire an image.

15. The system of claim 7, wherein an external event triggers the photo image camera to acquire an image.

16. The system of claim 7, wherein the converter further processes the digital photo image into a standardized storage format.

17. The system of claim 9, wherein the computerized game information system communicates sporting event game information data to the controller.

18. The system of claim 1 further comprising: an additional monitoring device, and wherein each monitoring device addresses an aspect of interest of the sporting event at a different location of the sporting event.

19. The system of claim 1, wherein the size of the digitized data frames varies in size.

20. The system of claim 1, wherein the size of the digitized data frames is fixed.

21. The system of claim 1, wherein the relational association includes matched time stamps.

22. A method for creating a video clip of a monitored sporting event, the method comprising:
    monitoring pre-determined characteristics of the sporting event with a monitoring device;
    collecting monitored data from the monitoring device, the monitored data addressing an aspect of interest of the sporting event;
    converting the monitored data into digitized data frames having a defined size;
    writing the monitored data in digitized data frames as a memory mapped file in a random access real-time storage buffer of a digitized data memory storage device, the random access storage buffer including time stamped digitized data frames with unique addresses;
    determining whether a digitized data frame is available from the real-time storage buffer;
    waiting for a new frame ready event indicating that the digitized data frame has been added to the real-time storage buffer in the event that the digitized data frame was not initially available from the real-time storage buffer;
    obtaining the digitized data frame of the monitored data from the real-time buffer when the digitized data frame is available from the real-time storage buffer;

adding the obtained digitized data frame to a clip file;
annotating the clip file clip with annotation information;
storing the annotation information in frame annotation storage in the clip file;
extracting a digitized data frame from the memory mapped file in the digital data memory storage device according to a predetermined criterion;
retrieving the annotation information in frame annotation storage; and
selecting, manipulating, and viewing the extracted digitized data frame and the collected monitored data with the annotation information on a viewing device.

23. The method of claim 22, wherein the monitored data is collected in real time relative to the aspect of interest.

24. The method of claim 22 further comprising:
time shifting the digitized data frames using the storage device.

25. The method of claim 22 further comprising:
performing a relational association upon the digitized data frames using the digitized data memory storage device.

26. The method of claim 22, wherein the monitoring device includes a video camera transmitting a continuous stream of video images.

27. The method of claim 26, wherein the video camera transmits at least one of a plurality of available pixel resolutions and a plurality of available variable temporal resolutions.

28. The method of claim 22, wherein the converter converts video streams of a standardized digital format into the digitized data frames.

29. The method of claim 22, wherein the monitoring device includes a single fixed digital photo image camera, and the single fixed digital photo image camera varies at least one of pixel resolution and inter photo time delay.

30. The method of claim 22, wherein the monitoring predetermined characteristics of the sporting event includes computerized game information with a formatted data stream wherein the computerized game information is relevant to the monitored sporting event.

31. The method of claim 22 further comprising:
distributing time stamped event information generated by changes in the monitoring device.

32. The method of claim 29 further comprising:
triggering the photo image camera to acquire an image using at least one of a user-initiated action, an external event, a formatted data stream, and the controller.

33. The method of claim 29 further comprising:
processing further the digital photo image into a standardized storage format using the converter.

34. The method of claim 30 further comprising:
communicating sporting event game information data to the controller using a computerized game information system that provides the formatted data stream relevant to the monitored sporting event for combination with the plurality of time-stamped digitized data frames from the digital data memory storage device to provide attributes related to the sporting event.

35. The method of claim 22 further comprising:
monitoring an additional aspect of interest of the sporting event using an additional monitoring device, wherein each monitoring device addresses an aspect of interest from a different location of the sporting event.

36. The method of claim 22, wherein the size of the digitized data frames varies in size.

37. The method of claim 22, wherein the relational association includes matched time stamps.

* * * * *